Patented Dec. 2, 1941

2,264,899

UNITED STATES PATENT OFFICE 2,264,899

ELECTROLYTIC CONDENSER

Alexander M. Georgiev, Dayton, Ohio, assignor to General Motors Corporation, Detroit, Mich., a corporation of Delaware No Drawing. Application May 25, 1939,
Serial No. 275,604

3 Claims. (Cl. 175—315)

This invention relates to electrolytes and is particularly concerned with electrolytes used in electrolytic cells, such as electrolytic condensers and the like.

An object is to provide a method for chemically dehydrating electrolyte solutions wherein a reagent is utilized which remains in the solution after performing its dehydrating function and has no deleterious effects thereon.

A still further object is to provide a method for dehydrating electrolyte solutions wherein the product of the dehydration step is one of the required ingredients of the electrolyte.

In carrying out the above object it is a further object to provide an addition agent for electrolyte solutions which has a dehydrating effect on the solution.

Further objects and advantages of the present invention will be apparent from the following description.

In the manufacture of dry, or semi-dry electrolytic condensers, electrode foils or plates separated by an absorbent spacer are utilized, such a spacer usually being paper or gauze. The foils are filmed either electrolytically or chemically and the porous spacer is impregnated with a suitable electrolyte.

In such condensers the electrolyte is more efficient if its water content is reduced to a minimum compatible with the required conductivity of the solution. Excess water is conducive to cause attack of the films and the electrodes, increases the leakage current and lowers the breakdown voltage. Such a condition causes the condenser to be less efficient and also is the direct cause of many condenser failures.

In the manufacture of electrolytes for condensers it is the usual practice to mix the ingredients and then, by use of special equipment, dehydrate the electrolyte by evaporation of the water contained therein. Such water may be residual from the reagents used or may be a reaction product of the combination of various reagents used to make up the electrolyte. Such a dehydration step is usually accompanied by the loss of some of the more or less volatile constituents, for example, ammonia, ethylene glycol, glycerin, etc., or any other volatile ingredients which may happen to be in the electrolyte solution. Evaporation of the electrolyte delays the production cycle and requires expensive equipment, such as aluminum kettles, ventilating equipment, etc. For these reasons evaporation of the free water is not desirable or economical.

This invention attacks the problem from a different angle with very satisfactory results and at low production costs. I have found that by the proper choice of a dehydrating agent that the free water may be removed from the solution by the combination of the dehydrating agent with the water and the resulting compound may remain therein without having any harmful effects on the characteristics of the solution. I have further discovered that in some cases it is possible to choose a dehydrating agent which when combined with the water in the solution becomes one of the desirable constituents of the electrolyte, thus providing a dual function of being one of the electrolyte reagents as well as the dehydrating agent.

Some of the more desirable of these addition agents are acetic anhydride, phosphorus pentoxide and tetraphosphoric acid, which has an empirical formula of $H_6P_4O_{13}$ and which is a mixture of 90% ortho-phosphoric acid, 48% pyrophosphoric acid, 43% meta-phosphoric acid, the compound having a phosphorus pentoxide content of 83.5%. In fact a number of the compounds of the broad class of acid anhydrides having strong dehydrating qualities are desirable, as well as some of the metal oxides which are known to be active dehydrating agents. In each case regardless of the reagent utilized the quantity thereof to be added is calculated so that sufficient dehydrating agent is added to chemically combine with the excess of water present.

A desirable electrolyte may be formed by using 98% by weight of high density glycerin (preferably containing not more than 2% water) and 1% ammonium acetate together with 1% phosphorus pentoxide or tetraphosphoric acid. The resulting electrolyte has a low content of free water and gives highly successful results when used in connection with filmed foils.

Another example of a prepared electrolyte is 90% glycerin (preferably containing not more than 2% water) about 10% acetic anhydride, which solution is substantially neutralized with ammonia gas. This electrolyte is very efficient and is easy to manufacture and inexpensive to produce.

The use of the addition agents herein disclosed is in no way limited to the specific applications set forth, but may be utilized in connection with any electrolyte by making the proper choice of the addition agent. Thus the addition agent may provide, by dissociation the necessary anions and cations in solution to produce the desired results, while in another instance the addition agent in its combined form may act as a more or less inert ingredient in the electrolyte solution.

From the foregoing it will be apparent that I have provided an addition agent for an electrolytic solution which actually removes free excess water therefrom, and utilizes this water for the formation of desirable ingredients within the electrolyte. I am aware of anhydrous electrolytic addition agents as used in the prior art which do not have a great affinity for water, and such reagents do not fall within the scope of my invention since they are not in effect dehydrating agents within the solution, and are ingredients which do not require the addition of water to form a desirable electrolyte. In other words, the acetic anhydride, for example, heretofore mentioned is in itself a poor electrolyte, but after exerting its dehydrating effect upon the solution, the water taken up thereby creates acetic acid which is a very desirable constituent part of the electrolyte. In some cases the compound added which has a strong affinity for water is after its reaction with the water an inert ingredient.

While the embodiment of the present invention as herein disclosed constitutes a preferred form, it is to be understood that other forms might be adopted, all coming within the scope of the claims which follow.

What is claimed is as follows:

1. A non-aqueous electrolyte for electrolytic condensers, comprising: a solution of a polyhydric alcohol and tetraphosphoric acid, the latter being present in an amount adequate to effect substantially complete dehydration of the alcohol.

2. A non-aqueous electrolyte for electrolytic condensers, comprising: a solution of glycerine and tetraphosphoric acid, the latter being present in an amount adequate to effect substantially complete dehydration of the glycerine.

3. A non-aqueous electrolyte for electrolytic condensers, comprising: a solution of a polyhydric alcohol, ammonium acetate and tetraphosphoric acid, the last two ingredients each constituting approximately one percent of the whole.

ALEXANDER M. GEORGIEV.